US00RE36033E

United States Patent [19]

Kappel

[11] E Patent Number: Re. 36,033

[45] Reissued Date of Patent: Jan. 12, 1999

[54] PROCESS FOR THE COMMINUTION OF MATERIALS AND PLANTS FOR CARRYING OUT THE PROCESS

[75] Inventor: Johannes Kappel, Graz, Austria

[73] Assignee: Maschinenfabrik Andritz Actiengesellschaft, Austria

[21] Appl. No.: 583,876

[22] Filed: Jan. 11, 1996

Related U.S. Patent Documents

Reissue of:

[64] Patent No.: 5,314,583
Issued: May 24, 1994
Appl. No.: 568,136
Filed: Aug. 16, 1990

[30] Foreign Application Priority Data

Aug. 16, 1989 [AT] Austria ..... 1940/89

[51] Int. Cl.[6] ..... D21B 1/16

[52] U.S. Cl. ..... 162/55; 162/65; 162/78; 162/81; 162/44; 162/26

[58] Field of Search ..... 162/23, 25, 26, 162/27, 65, 65 B, 78, 81, 29, 40, 43, 38, 44, 37, 47, 28

[56] References Cited

U.S. PATENT DOCUMENTS

| | | | |
|---|---|---|---|
| 396,325 | 1/1889 | Brin . | |
| 3,251,730 | 5/1966 | Watanabe | 162/56 |
| 3,316,141 | 4/1967 | Bergholm | 162/100 |
| 3,492,199 | 1/1970 | Kindron | 162/100 |
| 3,578,553 | 5/1971 | Godsay et al. | 162/81 |
| 3,627,629 | 12/1971 | Miller | 162/26 |
| 3,725,193 | 4/1973 | Montigny | 162/26 |
| 3,814,664 | 6/1974 | Carlsmith | 162/246 |
| 3,963,561 | 6/1976 | Richter | 162/65 |
| 4,160,693 | 7/1979 | Lindahl et al. | 162/29 |
| 4,216,054 | 8/1980 | Bentvelzen et al. | 162/57 |
| 4,270,976 | 6/1981 | Sandstrom et al. | 162/26 |

(List continued on next page.)

FOREIGN PATENT DOCUMENTS

| | | | |
|---|---|---|---|
| 380496 | 10/1985 | Austria . | |
| 384837 | 6/1987 | Austria . | |
| 392256 | 8/1990 | Austria . | |
| 0308314 | 11/1992 | European Pat. Off. . | |
| 2620744 | 3/1989 | France . | |
| 8002883 | 1/1988 | Japan . | |
| 0209964 | 4/1968 | U.S.S.R. | 162/43 |

OTHER PUBLICATIONS

Rydholm, Sven, "Pulping Process", N.Y. Interscience Publishers, 1967, pp. 663–665.

Liebergolt, N. et al. "The Use of Ozone in Bleaching and Brightening Wood Pulps: Part 1 Clinical Pulps" Pulping and Bleaching Seminar, New Orleans, LA (Nov. 1978).

"Ozone Gas Treatments of High Kappa Kraft Pulps", Procter, Pulp & Paper Magazine Canada, vol. 75, No. 6, Jun. 1974, pp. 58–62.

"Chlorine-Free Bleaching of Wood and Annual Plant Pulp", Prutsch et al., 1989 Wood & Pulping Chemistry, TAPPI Press, pp. 115–120.

(List continued on next page.)

*Primary Examiner*—Brenda A. Lamb
*Attorney, Agent, or Firm*—Roylance,Abrams,Berdo & Goodman, L.L.P.

[57] ABSTRACT

A process for the comminution, in particular defibrillation, and reaction of fibrous materials having a high dry solids content with the addition of a circulating medium, preferably a carrier gas and/or reaction agent, as well as optionally of chemicals. The invention is mainly characterized in that the circulating medium is recycled after leaving the comminuting device, by changing its temperature, and is then recycled to the comminuting device. Another embodiment of the invention is characterized in that the fibrous materials and liquid reaction agent are separated from the carrier gas and reaction agent vapors, which are then recycled back to comminuting device. A plant for carrying out this process is mainly characterized in that the comminuting device and route for recycling and treatment of the circulating medium form a closed system.

26 Claims, 3 Drawing Sheets

U.S. PATENT DOCUMENTS

| | | | |
|---|---|---|---|
| 4,278,496 | 7/1981 | Fritzvold | 162/65 B |
| 4,279,694 | 7/1981 | Fritzvold | 162/65 B |
| 4,288,288 | 9/1981 | Fleck | 162/26 |
| 4,295,927 | 10/1981 | Bentvelzen et al. | 162/65 |
| 4,326,913 | 4/1982 | Mattson | 162/17 |
| 4,363,697 | 12/1982 | Markham et al. | 162/19 |
| 4,372,812 | 2/1983 | Phillips et al. | 162/40 |
| 4,384,920 | 5/1983 | Markham et al. | 162/19 |
| 4,406,735 | 9/1983 | Samuelson | 162/81 |
| 4,555,254 | 11/1985 | Fisher | 162/28 |
| 4,806,203 | 2/1989 | Elton | 162/19 |
| 4,834,837 | 5/1989 | Loquenz et al. | 162/19 |

OTHER PUBLICATIONS

"Ozone Bleaching of Sulfite Pulp—A Pilot Plant Study", Norden et al., Swedish Assn. of Pulp & Paper Engineers, Apr. 1984, pp. 118–121.

"Bleaching a Softwood Kraft Pulp Without Chlorine Compounds", Liebergott et al., Tappi Journal, vol. 67, No. 8, Aug. 1984, pp. 76–80.

Annual Meeting '81, Tappi Press, Mar. 1981, vol. 64, No. 3.

"Efficient Ozone and Peroxide Bleaching of Alkaline Pulps from Pinus Radiata" Allison, Appita vol. 36, No. 1, Jul. 1982, pp. 42–46.

"Ozone Replaces Chlorine in the First Bleaching Stage—Advances in Ozone Bleaching—Part I", Singh, Tappi, Feb. 1982, vol. 65, No. 2, pp. 45–48.

"Non–Conventional Kraft Pulp Bleaching—The Role of Ozone", Kassebi et al., 1982 Pulping Conference, TAPPI Proceedings, pp. 327–340.

"The Use of Ozone in Bleaching Pulps", Liebergott et al., 1991 Pulping Conference, TAPPI Proceedings, pp. 1–23.

"Laboratory and Pilot Plant Bleaching of Various Pulps with Ozone", Patt et al., 1984 Oxygen Delignification.

"The Use of Ozone in the Pulp and Paper Industry", Gangolli, Paper Tech. and Industry, Jun. 1982, pp. 152–158.

"Continuous Oxygen Bleaching in Commercial Production", Rowlandson, TAPPI, vol. 54, No. 6, Jun. 1971, pp. 962–967.

"Potential Use of Ozone in the Pulp and Paper Industry", Soteland, Norwegian Pulp and Paper Institute No publication date given.

"Bleaching of Chemical Pulps With Oxygen and Ozone", Soteland, Pulp & Paper Magazine Canada, vol. 75, No. 4, Apr. 1974, pp. 91–96.

"The Role of Ozone in Chemical Pulp Bleaching", Patt et al., Holzforschung, vol. 45, 1991 Supplement, pp. 87–92, No publication date given.

"The Right Approach to Pollution–free Pulping—ASAM Pilot Plant Confirms Laboratory Test Results", Kraftanlagen Heidelberg, 1989.

"Bleiche von Sulfitzellstoff mit Sauerstoff und Ozon", Christensen et al., 34, Jahrgang, Heft 10A, 1980, pp. 23–29.

"Bleaching of Oxygen Pulps with Ozone", Rothenberg et al., TAPPI, vol. 58, No. 8, Aug. 1975, pp. 182–185.

"Die Bleiche von Sulfitzellstoffen unter Anwendung konventioneller und unkonventioneller Sequenzen", Carlberg et al., 36 Jahrgant, Heft 6, 1982.

"Zellstoffbleiche mit Sauerstoff und Ozon", Hruschka, Wochenblatt fur Papierfabrikation 17, 1986, pp. 681–686.

"Erfahrungen mit der Sauerstoff–Bleiche in einer Deutschen Sulfit–Zellstoffabrik", Scheuring, 40 Jahrgang, Heft 10A, 1986, pp. 8–16.

"Aus Der Zulieferindustrie", Papier Aus Osterreich Nr. 12, 1986, p. 43.

"Delignifizierung von Fichten–und Buchensulfitzellstoffen unter Verwendung von Ozon", Wang et al., 38 Jahrgang, Heft 6, 1984, pp. 245–249.

"Zellstoffabwasser und Umwelt", Aurand et al., 1983, pp. 37–55.

"Pates Kraft de Feuillus Prealablement Traitees Par L'oxygene—Blanchiment par L'ozone", Richard et al., Revue A.T.I.P., vol. 34, No. 2, Feb. 1980.

"Trockner und Trocknungsverfahren", Kroll, Trocknungstechnik, 1978, pp. 313–315.

"Happivalkaisuprosessi", Hillsvirta, Papper och Tra, No. 7, 1970.

"Der Richtige Schritt zur Umweltfreundlichen Zellstofferzeugung—Die Pilotanlage fur das ASAM–Verfahren", Kraftanlagen Heidelberg, 1989.

PROCESS FOR THE COMMINUTION OF MATERIALS AND PLANTS FOR CARRYING OUT THE PROCESS

Matter enclosed in heavy brackets [ ] appears in the original patent but forms no part of this reissue specification; matter printed in italics indicates the additions made by reissue.

REFERENCE TO RELATED APPLICATION

Reference is made to U.S. patent application Ser. No. 203,907 filed Jun. 8, 1988 in the name of Sbaschnigg, Baumgartner and Mausser for "Mixer for Pulp and Bleaching Chemicals", U.S. Pat. No. 4,913,358.

FIELD OF THE INVENTION

The invention relates to a process and plant for the comminution, in particular defibrillation, of fibrous materials of high consistency, i.e., having high dry solids content, which separates bundles of fibers into individual fibers or loose fiber structures, with the addition of a medium comprising a circulating gas composed of carrier gas, reaction agent, chemicals or a combination thereof.

BACKGROUND OF THE INVENTION

In recent years, increasing efforts have been made to effect bleaching of pulp with substances free of chlorine. The bleaching agent used is usually ozone, but $NO_x$, in particular $NO_2$, is also used. Bleaching with ozone is frequently carried out in the gaseous phase which requires comparatively high consistencies of fibrous materials. It is very important that pulp and ozone be intimately mixed to provide uniform delignification with a reduced amount of chemicals. The pulp fibers must be rendered freely accessible to ozone. This can be achieved, as is known in the art, by using a fluffer, or defibrator, in which the pulp is fluffed, i.e., separated into small bundles of fibers, by means of rotating elements.

Optimum delignification by means of ozone is achieved at room temperature or lower temperatures. This can be achieved in a pulp mill only with increased expenditure because following washing and sorting, the pulp reaches the bleaching station at markedly increased temperatures, especially if the mill is operated in a closed process. A pulp mill normally operates at temperatures between 60° C. and 80° C. and ozone will decompose at temperatures above 40° C. If optimum mixing of fibers and ozone is effected rapidly, the temperature-dependent degradation rate of ozone can be kept very low. Due to the high reactivity of ozone, the bleaching period as compared to other bleaching methods can be kept very short, in the range of seconds to minutes. The admixture of ozone into the pulp fibers and the reaction itself, as already mentioned, should be carried out at the lowest temperatures feasible.

Previously, it has not been possible to mix gases with fibrous materials having high dry solids content during the comminuting operation without the presence of considerable amounts of carrier gas, for instance air, whereby a mixture, containing for example, ozone, oxygen and air, is generated during comminuting or treatment, in particular in a reaction chamber. This is particularly undesirable in a bleaching operation. Moreover, this necessitates a large exhaust gas purification plant.

SUMMARY OF THE INVENTION

The invention is mainly characterized in that the medium or circulating gas, which includes the carrier gas, reaction agent, chemical promotor or any combination thereof, is treated after discharge from the comminuting device or mixer, in particular the defibrator, by changing its temperature, and is then recycled back to the defibrator. Use of an additional reaction apparatus for precise control of the reaction may be convenient.

According to one embodiment of the invention, comminuted, preferably, defibrillated material, specifically, fibrous material of high consistency, is passed from the defibrator with the circulating gas into a reaction apparatus from which the circulating gas is discharged, treated by changing its temperature, and then recycled to the defibrator.

Preferably, the reaction gas is ozone, $O_3$. However, $NO_x$, wherein x is an integer of from 1 to 3, inclusive, may be used as the reaction gas. The comminution/bleaching in the gaseous phase can further be carried out with use of a carrier gas. According to the invention, oxygen or carbon dioxide is used as the carrier gas depending upon the chosen reaction gas. Bleaching of the pulp may be promoted by using selected chemical compounds during the reaction or comminution. According to the invention, hydrogen peroxide, $H_2O_2$, is used as a chemical promotor.

The recirculating or recycled gas, i.e., the gaseous medium from the comminuting/bleaching process, in particular from the fibrous material bleaching, may subsequently be discharged from the defibrator, then cooled or heated, depending on the operating conditions. Following these process steps, at least a portion of the amount of circulating medium may be subjected to a gas treatment operation, for example, to convert oxygen to ozone, and then fed to the defibrator. When bleaching fibrous materials with or without using a separate reaction apparatus, the invention provides for at least a portion of the circulating gas to be discharged on leaving the defibrator and to be subjected to a treatment including a change of temperature and optionally a further chemicophysical treatment.

According to a further embodiment of the invention, the circulating medium, including carrier gas, reaction agent, chemical promotor or any combination thereof, is separated from the comminuted fibrous materials, and the circulating medium is recycled to utilize vaporized reaction agent in the defibration/bleaching zone to improve bleaching. For this, an additional reaction apparatus is used for separating vapors of the reaction agent and carrier gas from the fibers and non-gaseous reaction agent.

According to this embodiment, the reaction agent is preferably hydrogen peroxide, $H_2O_2$, while the preferred carrier gas is air. Thus, the reaction apparatus separates the comminuted fibers and liquid hydrogen peroxide from the circulating gas which includes carrier gas, air, and hydrogen peroxide vapors. Circulating gas including the vaporized hydrogen peroxide is then recycled to the defibrator in which fibrous materials are thus exposed to such vapors to increase the bleaching effect of the reaction agent and achieve a brightness gain. Bleaching of the pulp may also be promoted by using selected chemical compounds during the reaction or comminution.

The invention also relates to a plant for the comminution, in particular defibrillation, of fibrous materials of high consistency, with the addition of medium, i.e., circulating gas. According to the invention, the comminuting apparatus, in particular the defibrator, and the apparatus for recycling and treatment of the circulating gas, form a virtually or completely closed system. If a separate reaction apparatus is used for the bleaching reaction, the invention provides for the defibrator, the feeding system to the reaction apparatus, the reaction apparatus, and the apparatus for recycling and treatment of the circulating gas, to form a closed system. Infiltration of secondary air into the process is kept to a minimum according to the present invention by aspirating recirculating gas instead of environmental air via ventilation openings in the defibrator and by using an additional sealed packing screw at the entrance to the system. According to the invention, a sealed conveying means, in particular, a packing screw or cellular wheel sluice, by means of which the infiltration of secondary air is virtually, preferably completely avoided, is used for the addition of materials, in particular fibrous materials of high consistency, and of the circulating gas, if necessary, into the defibrator.

According to the present invention, the fibrous material and the circulating gas can be introduced into the comminuting device, in particular the defibrator, jointly through an inlet orifice directly with the fibrous material or through an auxiliary orifice leading into the entrance chute leading to the inlet orifice. The recirculating gas is also introduced into the defibrator via separate ventilation openings.

BRIEF DESCRIPTION OF THE DRAWINGS

The invention is explained on the basis of exemplary embodiments with reference to the accompanying drawings.

DESCRIPTION OF THE PREFERRED EMBODIMENTS

Figure 1:
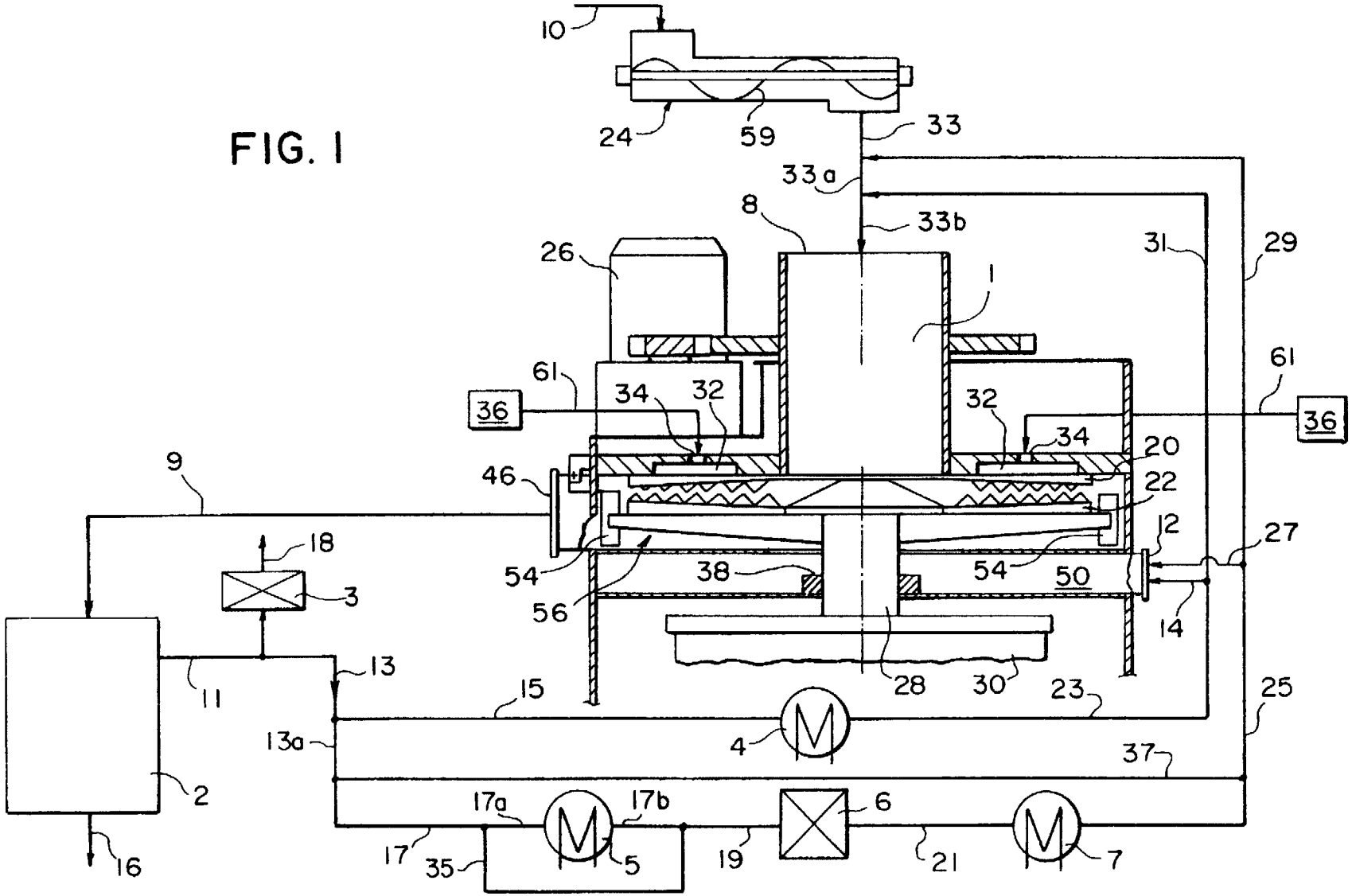
FIG. 1 shows a schematic process and plant diagram of the invention with the defibrator in partial longitudinal section.
Figure 3A:
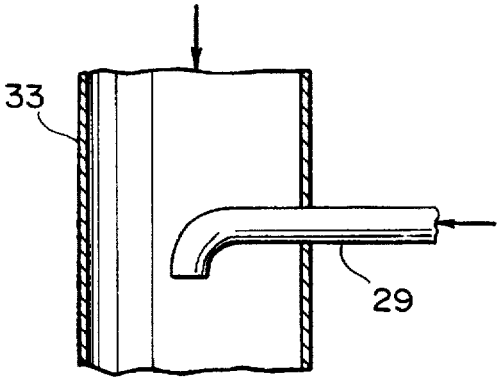
FIGS. 3a and 3b each show a schematic representation of a modification of the juncture between the recirculated gas route and the entrance chute leading to the inlet orifice.
Figure 3B:
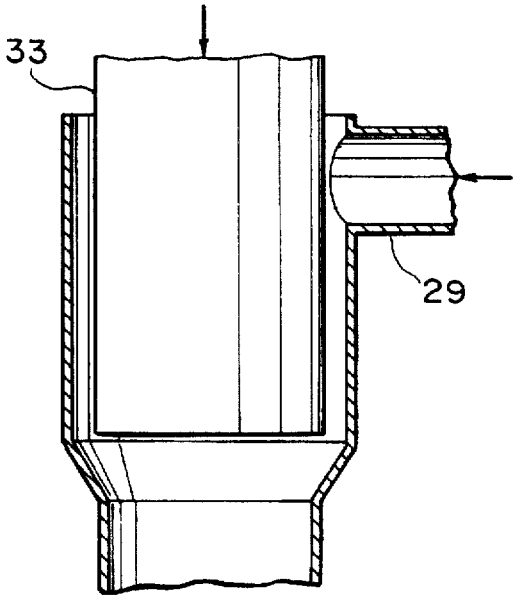
Figure 4:
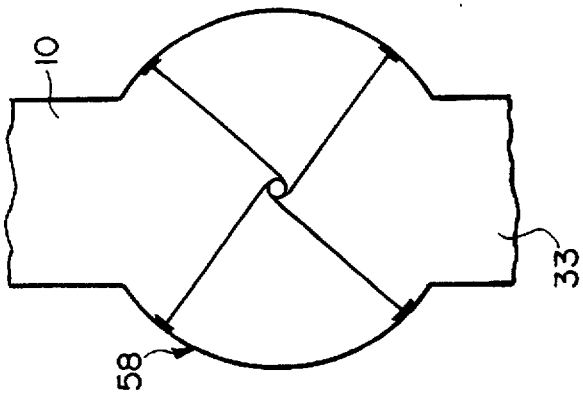
FIG. 4 shows an alternate sealed conveying assembly.

Referring to FIG. 1, fibrous material, i.e., pulp, having a consistency of 20–60%, preferably 30–40%, is introduced via process line 10 to a sealed conveying means 24. Fresh gaseous mixture, including carrier gas, reaction gas and optional promotor chemicals, may be jointly introduced with the fibrous material at line 10 through sealed conveying means 24. The infiltration of secondary air to the system during the introduction of material is largely prevented by using sealed conveying means 24, in particular packing screw 59 as shown in FIG. 1. Alternatively, the sealed conveying means 58 shown in FIG. 4 having a cellular wheel sluice 58 can be used. The system is closed and operates at about atmospheric pressure (1 bar absolute). To prevent leakage, a pressure of slightly less than atmospheric may be used. Reaction agent, carrier gas and chemical promotors can be introduced with the pulp by line 10 at this stage. The material is then conveyed to inlet orifice 8 of fluffer or defibrator 1 by entrance chute 33 shown as process lines 33, 33a, and 33b in FIG. 1. Entrance chute 33 has side access pipes for introducing recycled circulating gas via process lines 29 or 31. FIGS. 3a and 3b show alternative side access pipes which can accommodate a relatively small flow of circulating gas, see FIG. 3a, or a large flow of gas, see FIG. 3b, into chute 33.

Figure 2A:
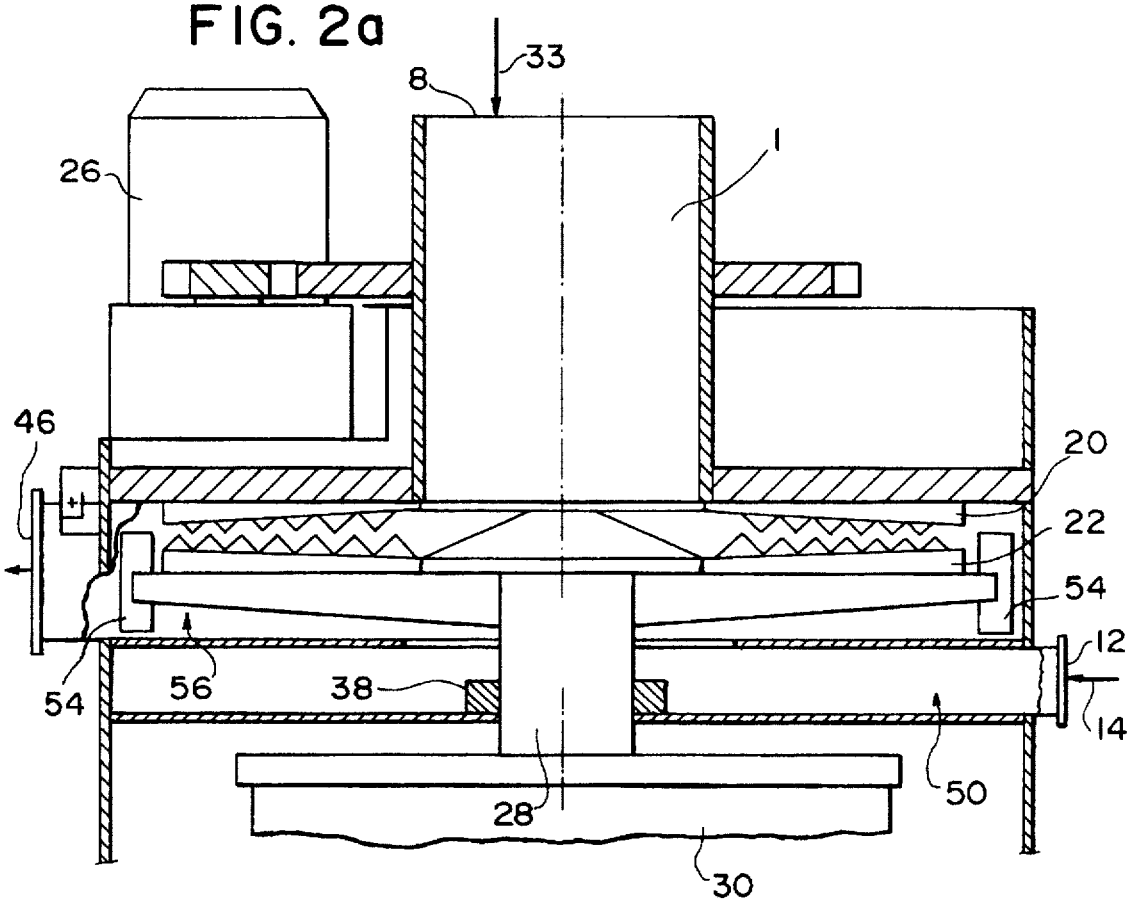
FIGS. 2a and 2b each represent a side elevation in partial longitudinal section of the defibrator showing a modification of the sealing assembly according to the invention.
Figure 2B:
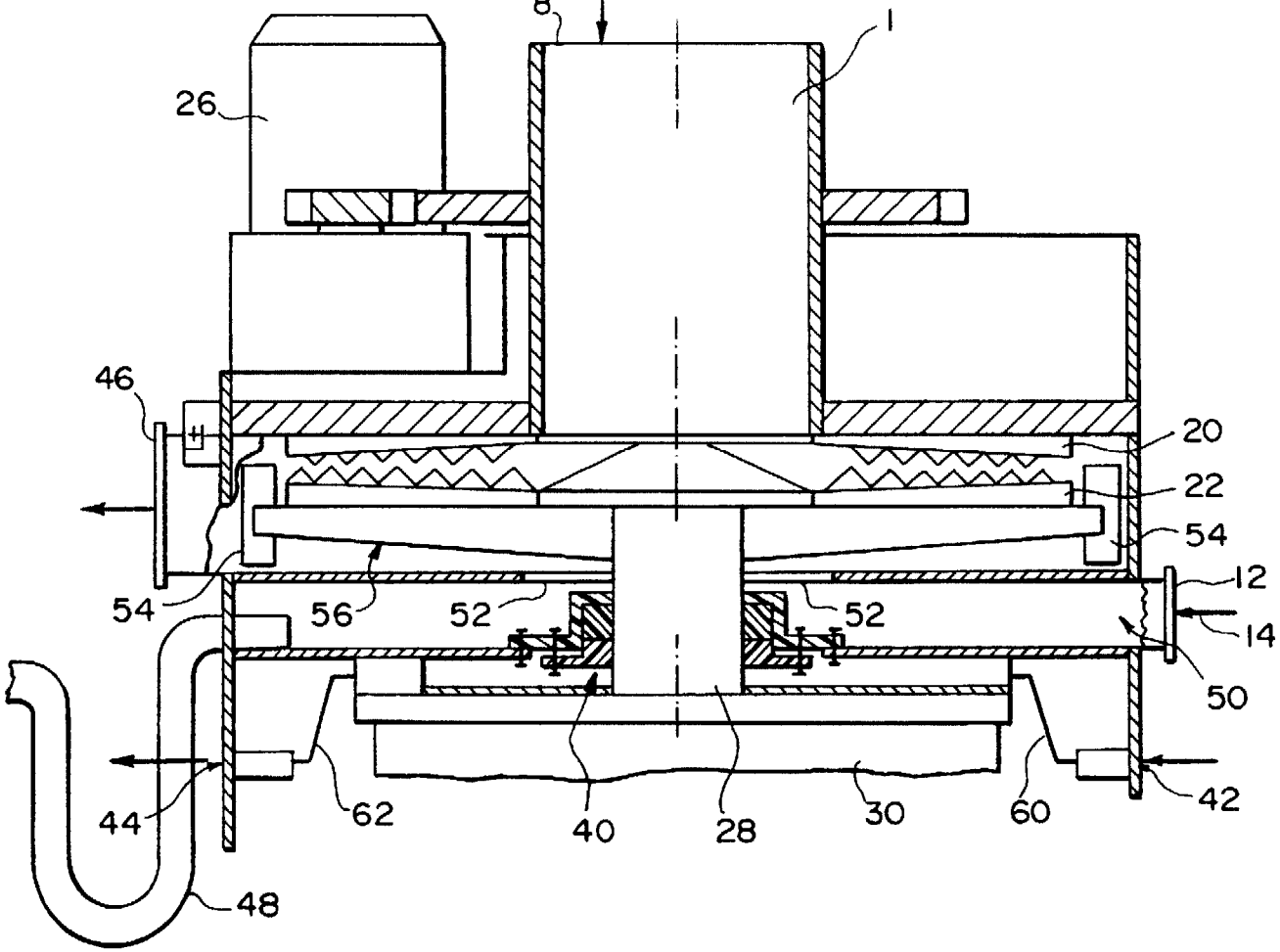

FIGS. 2a and 2b show a vertical sectional view of the comminuting device 1 according to the invention, in particular defibrator 1. As shown in FIGS. 2a and 2b, inlet orifice 8 serves for the introduction of fibrous material and circulating medium to defibrator 1 axially to grinding plates 20 and 22 by entrance chute 33. In addition, ventilation openings 12 in chamber 50 serve for the introduction of circulating medium in the direction of process lines 14 or 27 perpendicularly to the axis of rotation of grinding plates 20 and 22.

In defibrator or mixer 1, the fibrous material is comminuted and begins to be bleached by the reaction agent. Defibrator or mixer 1 has a structure similar to that shown in U.S. Pat. No. 4,913,358 to Sbaschnigg et al, which patent is hereby incorporated by reference. In one embodiment, ozone, $O_3$, is used as the reaction gas. However, other known bleaching agents may be used such as NO, $NO_2$, or $NO_3$. Another embodiment uses hydrogen peroxide, $H_2O_2$, as the reaction agent. It is noted that peroxide is a liquid, yet the circulating gas, according to the equilibrium of gaseous and liquid phase, contains peroxide vapor which is recirculated. When bleaching with ozone, oxygen is normally used as the carrier gas. If NO, $NO_2$, or $NO_3$ is used as the bleaching agent, carbon dioxide, $CO_2$, is used as carrier gas. Hydrogen peroxide bleaching uses air as carrier gas. Optional promotor chemicals are used to enhance bleaching. Hydrogen peroxide, $H_2O_2$, can be used as a chemical promotor in conjunction with ozone.

The comminution of the fibrous material is effected by means of grinding plates 20 and 22 located in comminuting chamber 56. The upper grinding plate or stator 20 is not rotatable, but can be moved in a vertical direction by electromotor 26, while the lower grinding plate or rotor 22 is rotatably supported via shaft 28. The lower grinding plate 22 is driven by an electromotor 30. According to the invention, the comminuting unit 1 is cooled or heated by means of a fluid on the rotor and/or stator side. Stator cooling is preferred and is accomplished by introducing cooling fluid such as water in cooling chambers 32 via lines 61 by passages 34 which are connected to a fluid source 36.

The pumping action is performed by the fluffer or defibrator 1. Discharge vanes 54 mounted on the rotor 22 form an axial ventilator which forces the mixture of pulp and circulating medium through the system and creates an under pressure in circulation chamber 50 located below the grinding plates. This pressure causes circulating gas entering through ventilating openings 12 to travel through chamber 50 and apertures 52, located in the top of chamber 50, to the grinding plates. The flow of circulating gas causes reaction agent and/or carrier gas to mix with the fibrous material. In the case of the ozone embodiment, the circulating gas has been cooled to preferably just below about 40° C. and therefore cools comminuting chamber 56. The comminuted or bleached material is discharged with the circulating gas via the outlet orifice 46 and follows process line 9.

OZONE EMBODIMENT

When using ozone, the seal between comminuting chamber 56 of defibrator 1, and its bearings is formed gas-tight and/or explosion-proof, in particular as a fluid-protected axial face seal or a seal filled or flushed with a barrier medium, conveniently barrier gas, optionally barrier water. FIG. 2a represents a vertical sectional view of the comminuting device according to the invention, in particular the defibrator 1, provided with an axial face seal 38, made of graphite and ceramic. Seal 38 prevents gas from leaving the defibrator. FIG. 2b shows a vertical sectional view of the comminuting device according to the invention, in particular the defibrator 1, provided with a stuffing box seal 40. Barrier water is introduced at inlet 42 to line 60 and passes to stuffing box seal 40 and flows up between the packings forming the seal to form a film of water on the bottom of chamber 50. The barrier water exits through line 62 and is discharged from outlet 44. Overpressure in chamber 50 is accommodated in U-shaped overflow pipe 48. The packings of stuffing box seal 40 are made of conventional material such as Teflon.

At temperatures above 40° C., ozone decomposes. Therefore, the bleaching operation is preferably carried out at temperatures below about 40° C. Since pulp mills generally operate at temperatures of 60° C.–80° C., cooling in the bleaching apparatus is desirable. The fibrous material, or pulp, and circulating gas are cooled before entering process line 10 and sealed conveying means 24, since there will be an increase in temperature from the mixing energy and exothermic heat of the bleaching reaction in defibrator 1. The fibrous material can be cooled by flushing with fresh water, while the gases can be cooled by conventional means.

After the comminuting operation in defibrator 1, the fibrous material, reaction agent and carrier gas are transported via process line 9 to reaction apparatus 2. Bleaching continues in reaction zone 2 for several minutes in the case of ozone. After reaction in zone 2, fibrous material separates from a mixture of carrier gas ($O_2$), reaction gas ($O_3$), and promotor chemicals by gravity, for example, and the fibrous material is discharged via process line 16.

Circulating gas including any remaining reaction agent ($O_3$), carrier gas ($O_2$), and carbon dioxide, which is formed in the bleaching reaction when ozone oxidizes the lignins, is subsequently conveyed in process line 11 where a portion of the gas exits to an exhaust gas discharge zone 3 to purge excess $CO_2$ via process line 18 if necessary. In gas discharge zone 3 the portion of the circulating gas to be discharged is treated to convert any remaining ozone to oxygen for release to the atmosphere. Thus, oxygen and carbon dioxide are ultimately released via process line 18 from gas discharge means 3.

The remainder of circulating gas travels through the system via line 13 to heat exchanger 4 for thermal treatment. In the case of ozone bleaching, the gas is cooled to a temperature in the range of from about 20° C. to about 40° C., preferably between about 30° C. and 40° C., with about 40° C. being the upper limit. The cooled gas is then conveyed along process line 23 for introduction into defibrator 1 through ventilating openings 12 via process line 14 and/or through entrance chute 10 via process line 31.

Alternatively, circulating gas which contains a major portion of oxygen from ozone decomposition, may be passed via line 17a to gas treatment zone 6 to convert oxygen to ozone by means of a conventional ozone generator, for example. Circulating gas to be treated in gas treatment zone 6 may be passed via line 17a and cooled in heat exchanger 5, and then passed via lines 17b and 19 to zone 6 for treatment. Heat exchanger 5 can be bypassed by means of process line 35 if cooling is not necessary before treatment in device 6. The freshly produced ozone is then passed via process line 21 to heat exchanger 7 for further cooling, if desired. Circulating gas is cooled to the desired range of from about 20° C. to about 40° C. and transferred to defibrator by process line 25 for introduction via process line 27 through ventilating openings 12 and/or via process line 29 to entrance chute 33. Conventional valve means may be utilized for selectively regulating the route of the circulating gas.

HYDROGEN PEROXIDE EMBODIMENT

In an alternate process, hydrogen peroxide $H_2O_2$, is used as reaction agent. Pulp is introduced into the system via lines 10 and 33 in the same manner as discussed with respect to the ozone reaction agent embodiment. The fibrous materials and circulating medium enter defibrator 1, are mixed and comminuted, and travel along process line 9 to reaction zone 2. In this case, hydrogen peroxide reaction agent is a liquid and is allowed to react with the fibrous materials for several hours. After a sufficient retention time has passed, the fibrous materials and liquid $H_2O_2$ are discharged via process line 16, while the resulting circulating gas is transmitted through the system to be recycled.

When hydrogen peroxide is the reaction agent, air is used as the carrier gas. The air absorbs hydrogen peroxide vapors while in reaction zone 2 and the vaporized hydrogen peroxide is recycled with the circulating gas. The use of hydrogen peroxide vapors in the defibrator enhances the brightness gain in the bleaching process.

Thus, circulating gas exits reaction zone 2 and is passed to defibrator 1 via process lines 11, 13, 13a, 37, 25, 27, and 29. All of the vapors from reaction zone 2 are recycled to defibrator 1, so gas discharge zone 3 is not utilized unless a buildup of gases occur in the system. In this case, gas discharge zone 3 would merely purge the excess gases, since they are nontoxic and, thus, treatment is unnecessary before release to the atmosphere. Thermal treatment of the recycled gas is not required because hydrogen peroxide does not decompose as rapidly as ozone. However, if cooling were desired in defibrator 1, the circulating gas could be routed through heat exchanger 4 before returning to defibrator 1.

In order to obtain an optimum adjustment of the plant according to the invention to the most diverse operating conditions, appropriate measuring and regulating means are provided on defibrator 1. According to the invention, the amount of circulating gas introduced into the defibrator 1, is controllable as a function of the process parameters.

In order to prevent fires or explosions in the plant according to the invention, further measures in addition to the already known use of an inert carrier gas (e.g. $CO_2$) may be used. Grinding plates 20 and 26 of defibrator 1 may contain or consist of a non-sparking material, such as beryllium. Defibrator 1 is conveniently separated from the reaction apparatus by means of an explosion protection system to render it blow-out proof. Sensors are located between defibrator 1 and reaction apparatus 2 which detect sparks and activate means for flushing the system with water. Temperature sensors can also be used which detect increases in temperature and activate steam vents to displace the oxygen and ozone in the system.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A process for treating high consistency fibrous materials, which comprises contacting fibrous material, a reaction agent and a carrier gas in a comminuting zone under a closed system to separate said fibrous material into smaller segments and react with said reaction agent;

passing said segmented fibrous material, reaction agent and carrier gas to a reaction zone for further reaction between said segmented fibrous material and said reaction agent;

separating said reaction agent in a liquid phase from said carrier gas to produce a remaining gaseous fraction including vapors of said reaction agent;

separating said gaseous fraction of said reaction agent and said carrier gas from said reaction zone and recycling said gaseous fraction to said comminuting zone for further reaction;

and discharging reacted, segmented fibrous material from said reaction zone.

2. The process of claim 1, wherein said reaction agent is hydrogen peroxide.

3. The process of claim 1, wherein said recycled gaseous fraction is passed through a heat exchange zone prior to introduction into said comminuting zone.

4. The process of claim 1, wherein said reaction agent is hydrogen peroxide, and the recycled gaseous fraction contains hydrogen peroxide vapors.

5. The process of claim 1, wherein said comminuting zone comprises means for comminuting fibers and said recycled gaseous fraction is introduced into said comminuting zone on two, opposed sides of said comminuting means.

6. The process of claim 5, wherein said comminuting means comprises at least one grinding plate means.

7. A process according to claim 1 wherein said high consistency fibrous materials has a consistency range between about 20% and 60%.

8. A process for treating high consistency fibrous materials, which comprises contacting fibrous material, a reaction agent and a carrier gas in a comminuting zone under a closed system to separate said fibrous material into smaller segments and react with said reaction agent;

passing said segmented fibrous material, reaction agent and carrier gas to a reaction zone for further reaction between said segmented fibrous material and said reaction agent;

separating a gaseous fraction of said reaction agent and said carrier gas from said reaction zone and recycling said gaseous fraction to said comminuting zone for further reaction; and discharging reacted, segmented fibrous material from said reaction zone;

wherein said reaction agent is $NO_x$, with x being an integer between 1 and 3, inclusive, and said carrier gas is carbon dioxide.

9. A process for treating high consistency fibrous materials, the process comprising contacting fibrous material, a reaction agent and a carrier gas in a comminuting zone under a closed system to separate said fibrous material into smaller segments and react with said reaction agent;

passing said segmented fibrous material, reaction agent and carrier gas to a reaction zone for further reaction between said segmented fibrous material and said reaction agent;

separating a gaseous fraction of said reaction agent and said carrier gas from said reaction zone and recycling said gaseous fraction to said comminuting zone for further reaction;

discharging reacted, segmented fibrous material from said reaction zone; and cooling said gaseous fraction in a heat exchange zone before recycling said gaseous fraction;

wherein said reaction agent is separated in the liquid phase from said carrier gas to produce said gaseous fraction including vapors of said reaction agent.

10. A process according to claim 1, wherein said reaction agent is hydrogen peroxide, said carrier gas is air, and said gaseous fraction being recycled contains hydrogen peroxide vapors and air.

*11. A process for treating high consistency fibrous materials comprising the steps of*

*contacting a high consistency fibrous material having a consistency of about 20% to 60% with a carrier gas and a reactant consisting essentially of ozone in a feed zone and feeding said fibrous material, ozone and carrier gas together to an inlet of a fluffer,*

*said fluffer comprising a stator grinding plate having a central opening defining said inlet of said fluffer, a rotating grinding plate opposing said stator grinding plate, and an outlet radially spaced from said inlet,*

*feeding said fibrous material, ozone and carrier gas into said inlet axially with respect to an axis of rotation of said rotating grinding plate,*

*passing said fibrous material, ozone and carrier gas in a substantially radial direction from said inlet and through a comminuting and reaction zone between said grinding plates of said fluffer towards an outlet and fluffing said fibrous material while in continuous contact with said ozone to produce simultaneously a partially reacted and fluffed fibrous material,*

*passing said fluffed fibrous material, ozone and carrier gas to a second reaction zone for further reaction,*

*separating unreacted ozone and carrier gas from said second reaction zone, and*

*discharging said fibrous material from said second reaction zone.*

*12. The process of claim 11, comprising*

*recovering said ozone from said second reaction zone and recycling said ozone to said fluffer.*

*13. The process of claim 12, comprising*

*cooling said ozone to about 20° C. to 40° C. before recycling.*

*14. The process of claim 11, comprising*

*recovering said ozone from said second reaction zone,*

*recycling said ozone onto a rear face of said rotating grinding plate, and*

*mixing said recycled ozone with said fluffed fibrous material.*

*15. The process of claim 14, further comprising*

*cooling said recycled ozone and introducing said recycled ozone to said fluffer to cool said grinding plates and said fibrous material.*

*16. The process of claim 11, further comprising*

*recovering ozone from said second reaction zone,*

*cooling said recovered ozone, and*

*recycling said cooled ozone to said fibrous material to cool said fibrous material before feeding to said inlet of said fluffer.*

*17. The process of claim 11, wherein said stator grinding plate and said rotating grinding plate are positioned to receive said fibrous material and ozone, and said process comprises*

*feeding said fibrous material and ozone substantially downwardly into said fluffer.*

*18. The process of claim 11, further comprising*

*passing said unreacted ozone and carrier gas from said second reaction zone to an ozone generator and increasing the ozone concentration in said carrier gas,*

*cooling said ozone and carrier gas to about 20° C. to 40° C., and*

*introducing said cooled ozone and carrier gas to said fluffer, and reacting said ozone with said fibrous material.*

*19. The process of claim 11, wherein prior to said contacting step, said process comprises*

*conveying said fibrous material through a sealed screw feeder and discharging said fibrous material to an inlet chute of said fluffer.*

*20. The process of claim 11, comprising*

*feeding said fibrous material to a screw feeder prior to feeding to said fluffer and conveying and discharging said fibrous material from said screw feeder into said inlet of said fluffer.*

*21. A process of treating high consistency fibrous materials, comprising the steps of*

*simultaneously feeding a high consistency fibrous material having a consistency of 20% to 60% and a mixture of a carrier gas and a reactant consisting essentially of ozone to a fluffer, said fluffer having a stationary grinding plate with said inlet extending through the center thereof, and a rotating grinding plate opposing said stationary grinding plate, said feeding step being in a coaxial direction with respect to an axis of rotation of said rotating grinding plate,*

*passing said fibrous material, ozone and carrier gas together through a comminuting and reaction zone between said grinding plates in a substantially radial direction to an outlet of said comminuting and reaction zone, and fluffing and reacting said fibrous material while in continuous contact with said ozone,*

*passing said fluffed fibrous material, unreacted ozone and carrier gas to a second reaction zone for further reaction,*

*separating unreacted ozone from said second reaction zone and recycling said separated unreacted ozone to said fluffer, and*

*discharging said fibrous material from said second reaction zone.*

*22. The process of claim 21, comprising*

*cooling said unreacted ozone to about 20° C. to 40° C. before introducing to said fluffer.*

*23. The process of claim 21, wherein*

*a portion of said separated unreacted ozone from said second reaction zone is recycled to said inlet of said fluffer.*

*24. The process of claim 21, wherein said grinding plates are disposed to receive said fibrous material and ozone, and said process comprises feeding said fibrous material and ozone downwardly into said fluffer.*

*25. The process of claim 21, comprising cooling said separated unreacted ozone from said second reaction zone prior to said recycling step, wherein a first portion of said cooled separated unreacted ozone is recycled to a lower portion of said fluffer to cool said rotating grinding plate, and wherein a second portion of said cooled separated unreacted ozone is recycled to said inlet to mix with and cool said fibrous material.*

*26. The process of claim 21, comprising*

*cooling said separated unreacted ozone from said second reaction zone prior to recycling to said fluffer, and*

*contacting said cooled separated unreacted ozone with said fibrous material to cool said fibrous material prior to feeding said fibrous material to said fluffer.*

* * * * *